(12) United States Patent
Kinoshita (10) Patent No.: US 8,159,632 B2
(45) Date of Patent: Apr. 17, 2012

(54) SURFACE LIGHT SOURCE ELEMENT AND IMAGE DISPLAY APPARATUS INCLUDING THE SAME

(75) Inventor: Seiji Kinoshita, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 57 days.

(21) Appl. No.: 12/865,768

(22) PCT Filed: Jan. 29, 2009

(86) PCT No.: PCT/JP2009/051425
§ 371 (c)(1),
(2), (4) Date: Aug. 2, 2010

(87) PCT Pub. No.: WO2009/096449
PCT Pub. Date: Aug. 6, 2009

(65) Prior Publication Data
US 2010/0328576 A1     Dec. 30, 2010

(30) Foreign Application Priority Data
Feb. 1, 2008  (JP) .................................. 2008-023277

(51) Int. Cl.
*G02F 1/1335* (2006.01)
(52) U.S. Cl. ................. 349/62; 349/61; 349/63; 349/64; 349/65; 349/68
(58) Field of Classification Search .................... 349/61, 349/62, 63, 64, 65, 68
See application file for complete search history.

(56) References Cited

U.S. PATENT DOCUMENTS
6,347,874 B1    2/2002   Boyd et al.
(Continued)

FOREIGN PATENT DOCUMENTS
JP          9211450         8/1997
(Continued)

OTHER PUBLICATIONS
U.S. Appl. No. 13/125,678, filed Apr. 22, 2011, Kinoshita.

*Primary Examiner* — Jennifer Doan
(74) *Attorney, Agent, or Firm* — Oblon, Spivak, McClelland, Maier & Neustadt, L.L.P.

(57) ABSTRACT

An object of the present invention is to provide a surface light source element configured to enhance projection light from an opening boundary of a supporting frame (12), wherein the projection light is required as a surface light source element, so that the surface light source element makes it possible to clearly illuminate an observation direction even in the case where the surface light source element is made large in size or thin in thickness. In the surface light source element using a light-guiding plate (1) provided with a prism pattern of a groove (9) that is V-character-like in section on a side of the bottom surface (7), the light-guiding plate (1) is characterized in comprising the prism pattern that enters from the edge of an opening of a supporting frame (12) to the incident edge surface side, wherein the prism pattern is arranged in a central direction of the light guide plate from a position of an angle θ ranging from 20° to 60° expressed by the following equation: L=T×tan θ where T: a thickness (mm) of the light guide plate (1), and L: a distance (mm) entering from the edge of the opening at the supporting frame (12) on an inner side of a liquid crystal panel to a back surface of the supporting frame (12).

7 Claims, 7 Drawing Sheets

U.S. PATENT DOCUMENTS

| | | | |
|---|---|---|---|
| 6,979,113 B2 * | 12/2005 | Nakano | 362/633 |
| 7,199,932 B2 * | 4/2007 | Sugiura | 359/625 |
| 7,528,898 B2 * | 5/2009 | Hashimoto | 349/58 |
| 2008/0130316 A1 | 6/2008 | Kinoshita et al. | |

FOREIGN PATENT DOCUMENTS

| | | |
|---|---|---|
| JP | 10 282342 | 10/1998 |
| JP | 11 282388 | 10/1999 |
| JP | 2002 260426 | 9/2002 |
| JP | 2003 114432 | 4/2003 |
| JP | 2003 523536 | 8/2003 |
| JP | 2004 213921 | 7/2004 |
| WO | 2006 013969 | 2/2006 |
| WO | 2007 088886 | 8/2007 |

* cited by examiner

(a) Total Mirror Surfaces (b) Diffusion Surface only Top Surface (c) Diffusion Surface only Side Surfaces (d) Total Diffusion Surfaces

SURFACE LIGHT SOURCE ELEMENT AND IMAGE DISPLAY APPARATUS INCLUDING THE SAME

TECHNICAL FIELD

The present invention relates to an edge-light type surface light source element having a plurality of primary light sources, and an image display apparatus using the same, more specifically to an edge-light type surface light source element used for liquid crystal display devices to which a high image quality is requested, illuminated sign devices or the like, and an image display apparatus using the edge-light type surface light source element.

BACKGROUND ART

There have been used two types, beneath-light type and edge-light type surface light source elements for an image display apparatus.

The beneath-light type surface light source element includes a plate-like member provided with a light-emitting surface and a plurality of primary light sources disposed on a back surface of the plate-like member. This type has a characteristic that it is easy to be large in size because the light sources are disposed on the back surface opposite to the light-emitting surface, and the element is widely used as a display of a television having a liquid crystal display device. Generally, the plate-like member on which the light-emitting surface is provided is structured by a plurality of optical sheets referred to as diffusion plates, prism sheets, diffusion sheets.

On the other hand, the edge-light type surface-light source element has a characteristic that it is possible to have a thickness thinner than the beneath-light type surface light source element because a plurality of primary light sources are disposed on a side surface of a light-guiding plate, and the element is widely used as displays such as mobile notebook computers, monitors or the like. Light emitted from the primary light sources is entered a light-guiding plate made of a transparent plate of transparent polymer molecule such as PMMA (polymethylmethacrylate) or the like, bent, transmitted in the light-guiding plate and emitted from an exit surface which is one of two principle surfaces of the light-guiding plate toward a liquid crystal panel. An optical sheet referred to as a prism sheet, or diffusion sheet and configured to collect light emitted from the exit surface and accomplish a high brightness is also used.

A printing of white dots is applied onto a reflection surface which is one of the two principle surfaces of the transparent plate-like light guide (light-guiding plate) to improve light use efficiency, and a size and a density of the dots are adjusted so that brightness distribution in the light-emitting surface of the surface light source element in a direction of viewing is equalized. Similarly, there is used a light guide in which a pattern including dots each having 100 to 500 μm in size and a disc-like shape having 10 to 50 μm in thickness is formed, and a top surface of the pattern is roughened is directly provided on the reflection surface of the light-guiding plate.

There is proposed a light guide (Patent Documents 1 to 3) provided with a pattern having more high use efficiency compared with the printing type light guide.

For example, Patent Document 3 discloses a light guide including concave or convex portions each having a trapezoidal shape in section, provided on at least one of an exit surface and a bottom surface. By the light guide, light entered the light guide through an incident end surface is taken in the bottom surface, and reflected light thereon is configured to be directed to the exit surface. In addition, by emitting light from the exit surface through trapezoidal convex stripes provided on the exit surface by use of the light guide, it is possible to emit light entered the light guide in a direction perpendicular to the incident end surface with an angle near a front direction.

Patent Document 1: Japanese Patent Application Publication No. H10-282342

Patent Document 2: Japanese Patent Application Publication No. 2003-114432

Patent Document 3: International Application Publication No. WO2006/013969A1

DISCLOSURE OF THE INVENTION

Problems to be Solved by the Invention

In recent years, large-size, lightweight, thinned, and low power image display apparatuses for television are strongly requested in a market.

A beneath-light type light-guiding plate is effective to form a large-size image display apparatus. By arranging primary light sources at small intervals in the beneath-light type and arranging LED light sources or the like in a matrix, a thinned backlight part is accomplished while maintaining image quality. However, there is a problem that the number of light sources increases and with the increment, power consumption is increased. In addition, because a thin diffusion plate is used for a light-emitting surface, if the diffusion plate and a primary light source located at a back surface of the diffusion plate are too close, there is a problem that variation in bright and dark of the light source is entered the light-emitting surface. Consequently, there is a limitation to form a thinned light-guiding plate.

Therefore, although an edge-light type effective to form a thinned light-guiding plate has been reviewed, when forming the light-guiding plate in a large size, this results in a long distance from an incident end surface of the light-guiding plate to a central portion of the light-guiding plate, when forming the light-guiding plate in a thinned size, this results in reduction of an energy entered the light-guiding plate through the incident end surface. Consequently, there is a problem that brightness at the central portion of the light-guiding plate is increasingly reduced.

In recent years, to compensate the brightness reduction, LED light sources or the like having a small size and emitting a strong light flux have been used, but they have no still required brightness.

An object of the present invention is to provide a surface light source element capable of illuminating brightly a viewing direction even though a large-size surface light source element or a small-size surface light source element is used, by using the fact that a size of an opening of a supporting frame for a liquid crystal panel, which combines the liquid crystal panel and a light-guiding plate is smaller than that of the light-guiding plate to increase light emitted from an opening area of the supporting frame required as the surface light source element, that is, by collecting and emitting light emitted from a primary light source in an effective area and an effective viewing direction, and an image display apparatus including the surface light source element.

Means for Solving the Problems

An edge-light type surface light source element according to a first invention includes a light-guiding plate including at least a side surface, an exit surface, and a bottom surface opposite to the exit surface, at least one primary light source disposed on the side surface of the light-guiding plate, the light-guiding plate including an incident end surface configured to enter light emitted from the primary light source, reflection means provided on a bottom surface side of the light-guiding plate and configured to reflect light, and a supporting frame to support a liquid crystal panel and an optical sheet, which are provided on an exit surface side of the light-guiding plate.

If a normal line of an X-Y plane formed an X axis and a Y axis perpendicular to the X axis is a Z axis, the primary light source is disposed parallel with the X axis.

The reflection means, the light-guiding plate, the optical sheet, and the liquid crystal panel supporting frame are disposed parallel with the X-Y plane.

The reflection means, the light-guiding plate, the optical sheet, and the supporting frame are sequentially disposed in a direction of the Z axis. The incident end surface of the light-guiding plate being disposed parallel with an X-Z plane.

A pattern formed by a plurality of concave stripes arranged parallel with the X axis is provided in the bottom surface, and inclined surfaces are provided on an incident end surface side of the plurality of concave stripes and arranged parallel with the X axis, an angularity of each of the inclined surfaces to the bottom surface being substantially within a range of 25° or more to 45° or less.

If an angle formed by the Z axis and a straight line which combines an intersection point of a side parallel with the X axis, of an opening boundary inside the supporting frame and a Y-Z plane and a point at which the pattern provided on the bottom surface to be parallel with the X axis and formed by the plurality of concave stripes is set first is θ, and a distance getting from the opening boundary of the supporting frame of the liquid crystal panel into a back surface of the supporting frame is L, the pattern provided on the bottom surface and formed by the concave stripes parallel with the X axis is disposed to satisfy the following equation, and the angle θ is within a range of 20° to 60°.

$$L = T \cdot \tan \theta$$

T: thickness of light-guiding plate (mm)
L: distance getting from opening boundary of supporting frame of liquid crystal panel into back surface of supporting frame (mm)

A second invention is the edge-light type surface light source element, according to the first invention, wherein primary light sources are arranged on two opposite incident end surfaces of the light-guiding plate, and the inclined surfaces of the plurality of concave stripes are arranged parallel with the two incident end surfaces and the X axis.

A third invention is the edge-light type surface light source element, according to the first or second invention, wherein each of the concave stripes provided in the bottom surface of the light-guiding plate has a V-character shape in section.

A fourth invention is the edge-light type surface light source element, according to the first or second invention, wherein each of the concave stripes provided in the bottom surface of the light-guiding plate has a trapezoidal shape in section.

A fifth invention is the edge-light type surface light source element, according to any one of first to fourth inventions, wherein a pattern comprising a plurality of convex stripes parallel with the Y axis is provided on the exit surface of the light-guiding plate.

A sixth invention is the edge-light type surface light source element, according to the fifth invention, wherein each of the convex stripes provided on the exit surface of the light-guiding plate has a trapezoidal shape in section.

A seventh invention is an image display apparatus, comprising the edge-light type surface light source element according to any one of the first to sixth inventions, and a light-transmitting type display element provided on an exit surface side of the surface light source element.

Effects of the Invention

The surface light source element according to the first invention is an edge-light type surface light source element. The concave stripes provided in the bottom surface opposite to the exit surface of the light-guiding plate included in the surface light source element according to the present invention are arranged based on a position satisfying the following equation, if a distance which is from the opening boundary of the supporting frame of the liquid crystal panel into the back surface of the supporting frame is L. The surface light source element has a function, by adjusting an angle θ to be 20° to 60°, to enhance brightness at a central portion of the light-guiding plate and inhibit light leakage at a boundary of the supporting frame of the liquid crystal panel.

$$L = T \cdot \tan \theta \tag{1}$$

T: a thickness of a light-guiding plate (mm)
L: a distance entering from an opening boundary of a supporting frame of a liquid crystal panel into a back surface of the supporting frame (mm)

As the aforementioned second invention, if the primary light sources are disposed on the opposite two incident end surfaces of the light-guiding plate, respectively, it is possible to achieve high incident efficiency of light from the primary light sources into the incident end surfaces, and reduce a thickness of light-guiding plate when having the same brightness performance because lights are entered the two incident end surfaces, thus to be thin the surface light source element, compared with two primary light sources provided on one incident end surface. In addition, because incident end surfaces are provided on the both ends of the light-guiding plate, surface brightness distribution in a light-emitting area on a central line between one incident end surface and another incident end surface opposite to the one incident end surface may be adjusted. Thereby, it is possible to achieve easily equalization of surface brightness distribution, compared with a light-guiding plate having one incident end surface.

As the aforementioned third invention, if each of the concave stripes provided in the bottom surface of the light-guiding plate has a V-character shape in section, of lights guided in the light-guiding plate, it is possible to emit light directly entered inclined surfaces of each of the V-shaped concave stripes in the incident end surface side with an angle very near a front direction to perform total reflection, and therefore increase brightness in the front direction.

As the aforementioned fourth invention, if each of the concave stripes provided in the bottom surface of the light-guiding plate has a trapezoidal shape in section, it is possible to increase brightness in the front direction, similarly to the V-shaped concave stripes and achieve high production efficiency, when making the light-guiding plate by an injection mold process, because the light-guiding plate has excellent mold-release property to a mold.

As the aforementioned fifth invention, when the convex stripes are formed on the exit surface of the light-guiding plate, if at least one incident end surface of the light-guiding plate is disposed parallel to the X axis, the convex stripes provided on the exit surface of the light-guiding plate are disposed parallel to the Y axis, a direction of the X axis is a horizontal direction, and a direction of the Y axis is an up and down direction, because light reflected on the bottom surface of the light-guiding plate can be deflected by the convex stripes arranged on the exit surface in a horizontal direction, it is possible to improve view angle characteristic.

In particular, as the aforementioned sixth invention, when the convex stripes each having a trapezoidal shape in section and arranged parallel to a plane formed by the X axis and the Z axis are arranged parallel to the Y axis, it is possible to emit light in the front direction directly, and hence acquire high brightness, by emitting light near a direction of normal line of the exit surface from each trapezoidal upper bottom surface, of lights reflected on the concave stripes provided in the bottom surface of the light-guiding plate. If light is entered the trapezoidal inclined surfaces, because it is possible to broaden the emitted light in the horizontal direction, the surface light source element has a function that a wide view angle characteristic can be maintained.

In this way, because the light-guiding plate included in the surface light source according to the present invention has the concave stripes which are arranged on a predetermined position of the bottom surface opposite to the exit surface and configured to emit light emitted from the primary light source entered the incident end surface, it is possible to enhance brightness as viewed the exit surface from a front surface thereof. If convex stripes are provided on the exit surface, because an emitting direction of light emitted from the light-guiding plate can be controlled, it is possible to provide an image display apparatus having high brightness and excellent view angle characteristic.

BRIEF DESCRIPTION OF THE DRAWINGS

[FIG. 5](a) is a side view explaining the generation of light leakage from an opening boundary of a supporting frame, and (b) is a view showing one example of the surface light source element according to the present invention and the inhibition of light leakage from the opening boundary of the supporting frame.

MODE FOR CARRYING OUT THE INVENTION

A best mode for carrying the invention will be explained hereinafter. Here, in drawings as mentioned hereinafter, schematic drawings in which reduction scales of length and width direction sizes of parts are arbitrarily changed are used for convenience of description.

First, a surface light source element according to the present invention is generally structured by a light-guiding plate which comprises a flat plate-like transparent structure made of a transparent resin material or the like, a primary light source disposed on a side surface of the light-guiding plate and a reflection sheet disposed on a lower surface of the light-guiding plate.

The light-guiding plate can be structured by a transparent resin having a high light transmission ratio. As transparent materials which can be used, for example, methacryl resin, acrylate resin, polycarbonate resin, polyester resin, cyclic polyolefin resin or the like can widely be adopted.

The light-guiding plate is provided at one surface thereof with an exit surface and with a bottom surface disposed to opposite to the exit surface. The side surface of the light-guiding plate on which the primary light source is disposed is formed as an incident end surface.

In the present invention, the incident end surface may be provided in at least one place, but a plurality of incident end surfaces may be provided in a plurality of places. If the incident end surface is provided in one place, reflection end surfaces are preferably provided on side surfaces of the light-guiding plate except for the incident end surface.

In a typical embodiment in which incident end surfaces are provided in two places, primary light sources are provided opposite side surfaces of the light-guiding plate, in this case, reflection end surfaces are provided on both side surfaces of the opposite side surfaces on which the primary light sources are disposed. It is necessary to satisfy a condition in which the incident end surfaces provided in the two places are parallel with concave stripes provided in the bottom surface, and arranged to be perpendicular to convex stripes, if the convex stripes are provided on the exit surface.

The primary light source is disposed to face the incident end surface. Any light sources can be used at the primary light source. A line-like light source such as a cold-cathode tube or fluorescent tube may be used, and a plurality of point light sources such as a plurality of LED light sources linearly arranged may be used.

In the present invention, a reflection means configured to reflect light is provided in a side contacting with the bottom surface of the light-guiding plate and has a function to allow light emitted from the bottom surface of the light-guiding plate to enter the light-guiding plate again. It is preferable for the reflection means to have a reflectance ration of 95% or more to acquire high light use efficiency. A metallic foil such as aluminum, silver, or stainless, a white painting, foam PET (polyethylene terephthalate) resin or the like may be used as a material of the reflection means or plate. It is preferable for the reflection means to use a material having high reflectance ratio to improve light use efficiency. Silver, a foam PET or the like is used for the material. It is preferable for the reflection means to use a material to perform diffusion reflection to improve a degree of uniform brightness. A foam PET or the like is used for the material.

In the light-guiding plate of the surface light source element according to the present invention, concave stripes are provided disposed at predetermined pitches on the bottom surface of the light-guiding plate. The concave stripes are arranged so that concave portions in section extend in one direction. A sectional shape of each of the concave stripes may be a predetermined shape such as a triangular shape, a wedge-like shape, other polygonal shape, an undulate shape, a half-ellipsoidal shape or the like. An angularity of inclined surfaces of each of the concave stripes at a side of the primary light source relative to the bottom surface is substantially a range of 25° to 45°, an average angularity of the inclined surfaces to the bottom surface is equally set. If the angularity is 45° or more, brightness at an angle adjacent to a direction of front of the exit surface of the light-guiding plate is rapidly changed, it is not possible to remove dark lines if a large number of diffusion sheets are disposed. On the other hand, if the angularity is 25° or less, it is difficult to increase an amount of luminescence in the direction of front even if an optical sheet such as a BEF made by Sumitomo 3M Ltd. is used.

Here, the concave stripe formed in a section may be set to be increased gradually in height as going away from the primary light source. Also, the concave stripe may be structured so that a shape changes gradually as going away from the primary light source. This structure in which the shape changes gradually, for example, if the concave stripe has a trapezoidal shape in section, includes a case where the shape changes gradually while a length of each of an upper bottom and a lower bottom of the trapezoidal shape changes gradually while an angle of each of the inclined surfaces of the trapezoidal concave stripe relative to the bottom surface is constantly maintained. The structure makes it possible to increase further evenness of brightness in the exit surface.

Figure 2:
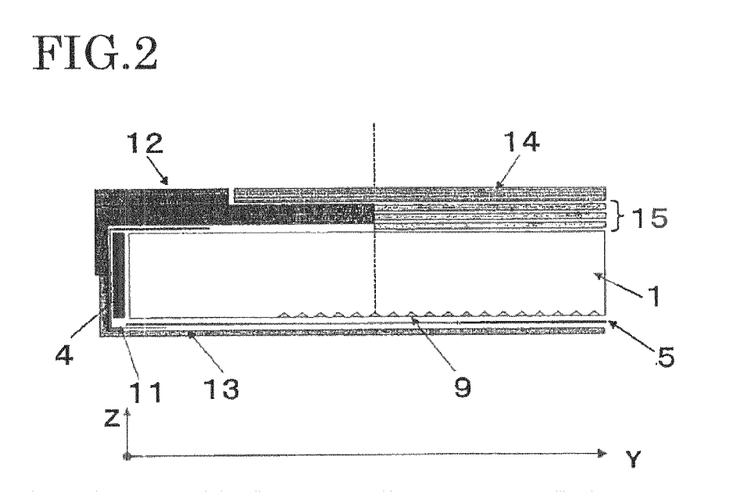
[FIG. 2] is a side view showing one example of an image display apparatus according to the present invention.

As shown in FIG. 2, there is provided a liquid crystal panel supporting frame referred to as "bezel" supporting a liquid crystal panel and configured to fix the liquid crystal panel to a metallic frame which is a supporting board of a backlight. The light-guiding plate is integral with the primary light source and a light source reflection plate (reflector) to incorporate effectively light emitted from the primary light source into the incident end surface of the light-guiding plate, disposed at a back surface of the supporting frame, and fixed to the metallic frame which is the supporting board of the backlight. A plastic material such as polycarbonate colored not to transmit light is preferably used for the supporting frame. Usually, an opening area of the supporting frame is set to be lesser than the exit surface of the light-guiding plate in size in view of variation in moisture absorption of the light-guiding plate, variation in a size due to a temperature, a design property of an image display apparatus, and handling ability in an assembling process.

Figure 4:
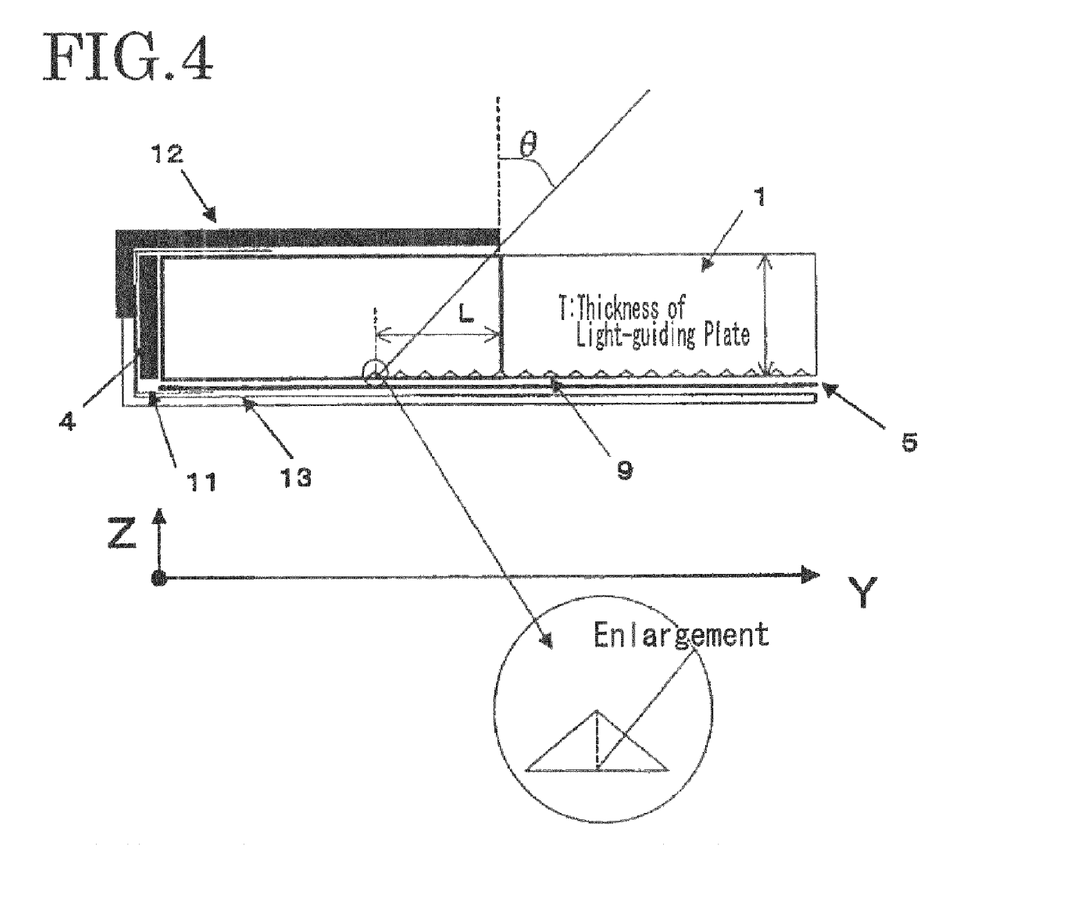
[FIG. 4] is a side view showing one example of the surface light source element according to the present invention.

When the incident end surface of the light-guiding plate is disposed parallel to the X-Z plane, and a pattern composed of a plurality of concave stripes provided in the bottom surface to be parallel to the X axis is formed, of an opening boundary inside the liquid crystal panel supporting frame as shown in FIG. 4, if an angle of a line connecting an intersection point a side parallel to the X axis and the Y-Z plane and a point where the pattern of the bottom surface comprising the concave stripes parallel to the X axis is initially provided from the incident end surface, to the Z axis is θ, the angle is selected from a range of 20° to 60°.

Figure 3:
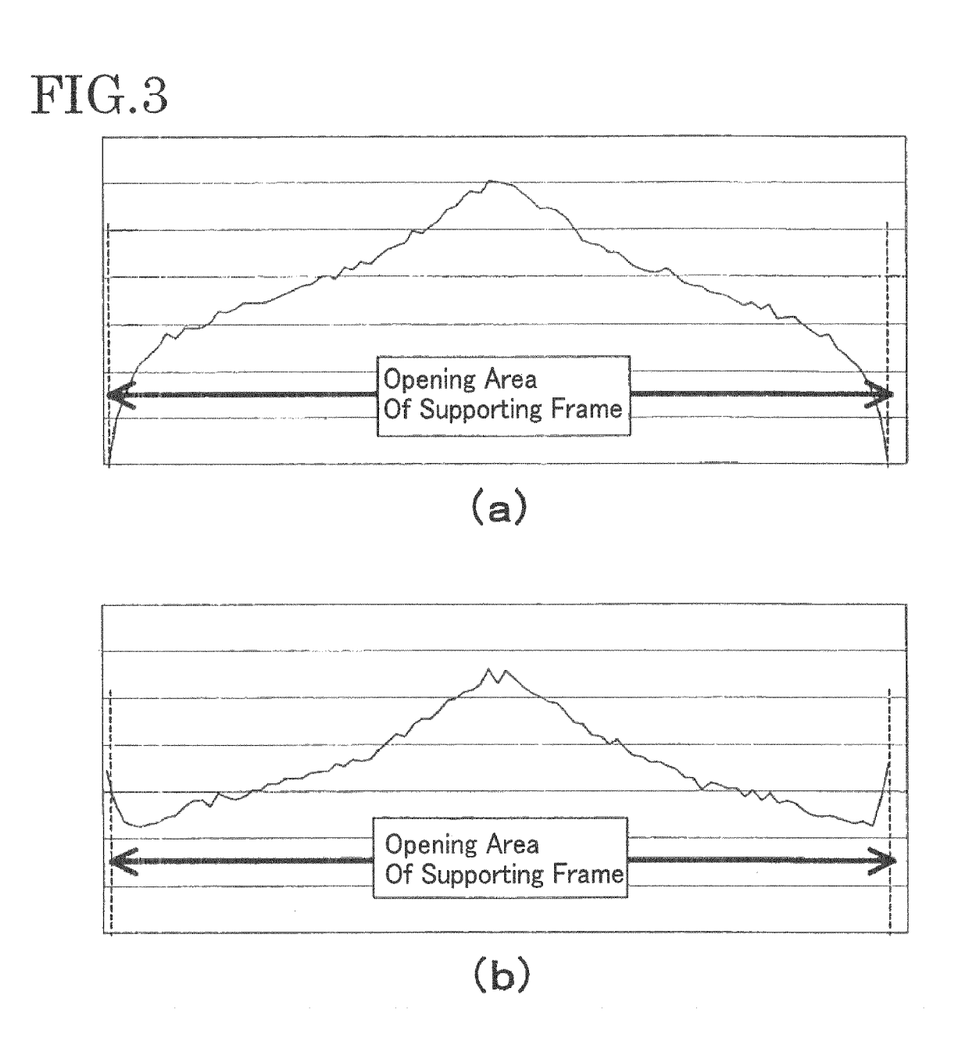
[FIG. 3] is a view showing a brightness distribution on a straight line which passes through a central point of an incident end surface of a light-guiding plate included in the surface light source element according to the present invention and is parallel to a Y axis, wherein (a) shows brightness distribution if θ is less than 20°, (b) shows brightness distribution if θ is more than 60°.

FIG. 3(a) illustrates a distribution of light in the supporting frame opening area at the time of measuring brightness on the exit surface along a straight line which is parallel to the Y axis and passes through a middle point of the incident end surface of the light-guiding plate, if the angle θ is less than 20 degrees. In this case, the supporting frame boundary is in a reduced brightness and is recognized visually as a dark part. FIG. 3(b) illustrates a distribution of light in the supporting frame opening area at the time of measuring brightness on the exit surface along a straight line which is parallel to the Y axis and passes through a middle point of the incident end surface of the light-guiding plate, if the angle θ is more than 60 degrees. In this case, the supporting frame boundary is in a high brightness, thereby light is leaked from the supporting frame boundary. If the angle θ is set to be within a range of, preferably 30° to 55°, it is possible to enhance evenness of brightness in a plane of the light-guiding plate. This is because it is possible to improve brightness performance at a center of the light-guiding plate in the small angle side and restrain reduction of brightness at an opening boundary of the supporting frame for the liquid crystal panel in the large angle side. The angle θ is more preferably set to be in a range of 35° to 50°. With the aforementioned structure, it is possible to further enhance a balance of brightness performance in the front direction and the evenness of brightness in the plane of the light-guiding plate.

Even in either case, the structure of the bottom surface is controlled so that light deflected by use of the bottom surface of the light-guiding plate and the reflection sheet is emitted from the exit surface with a predetermined strength. This control is achieved by a combination of the bottom surface and the reflection sheet or by using other adjustment means together.

In particular, in the light-guiding plate of the surface light source element according to the present invention, if each of the concave stripes provided in the bottom surface has a V character-like shape, the V-shaped concave stripes are arranged parallel to the incident end surface, when the V-shaped concave stripes are arranged in this case, it is possible to restrain leak of light at the opening area of the supporting frame and improve quality of an image screen of the liquid crystal panel. In addition, if a diffusion sheet or prism sheet is placed on the light-guiding plate, it is possible to further enhance brightness in the front direction.

Moreover, an average angularity of each of the inclined surfaces of the concave stripes provided in the bottom surface is within a range of 25° to 45°, set within a range of preferably 35° to 45° to acquire excellent view angle characteristic and preferably 37.5° to 42.5° to acquire high brightness and excellent view angle characteristic. Each of the inclined surfaces is set within a range of 1 μm to 100 μm in height, preferably 5 μm to 50 μm for Moire reduction, and more preferably 5 μm to 20 μm to accomplish evenness of surface brightness at a vicinity of the primary light source.

It also is desirable to facilitate an optical design when a sectional shape is constant of the concave stripes provided in the bottom surface.

If an oblique side in section of each of the concave stripes provided in the bottom surface is a straight line, an average angularity of the oblique side of each concave stripe in the incident end surface side, parallel to the X axis, relative to the bottom surface is an inner angle of a sectional surface made by the bottom surface and the oblique surface, and has an average value of a base angle which is usually an acute angle.

Next, a principle in which brightness is enhanced and light leak at the opening boundary of the supporting frame can be inhibited is explained as an example a case where concave stripes each of which has a V character-like shape in section are provided in the bottom surface of the light-guiding plate.

Light entered the incident end surface of the light-guiding plate is directed in the front direction by the concave stripes disposed in the bottom surface of the light-guiding surface and emitted from the exit surface, or is emitted once from the bottom surface of the light-guiding plate passing through the concave stripes, diffused by the reflection sheet disposed at the lower portion of the light-guiding plate and entered the light-guiding plate again and emitted from the exit surface. When the concave stripes are provided at a position right beneath of the supporting frame, departing from a scope of the present invention, light reflected on the concave stripes, or light going out of the concave stripes once, diffused by the reflection sheet, and entered the light-guiding plate again and emitted from the exit surface in an emitted direction is reflected on a back surface of the supporting frame and returned into the light-guiding plate again. When repeating such a state, because energy loss of light occurs, light-emitting efficiency is reduced.

When the concave stripes are arranged in an area of the scope in accordance with the present invention, because light entered the incident end surface of the light-guiding plate is totally reflected between the bottom surface and the exit surface of the light-guiding plate and can be moved in a central direction of the light-guiding plate, it is possible to prevent the aforementioned energy from losing. In addition, light guided in the central direction of the light-guiding plate is emitted from the concave stripes arranged in the bottom surface at the opening area of the supporting frame and the vicinity thereof. That is to say, while guiding light in an area just beneath the supporting frame, because light-emitting efficiency is prevented from being reduced, improvement of the brightness is accomplished.

Figure 5:
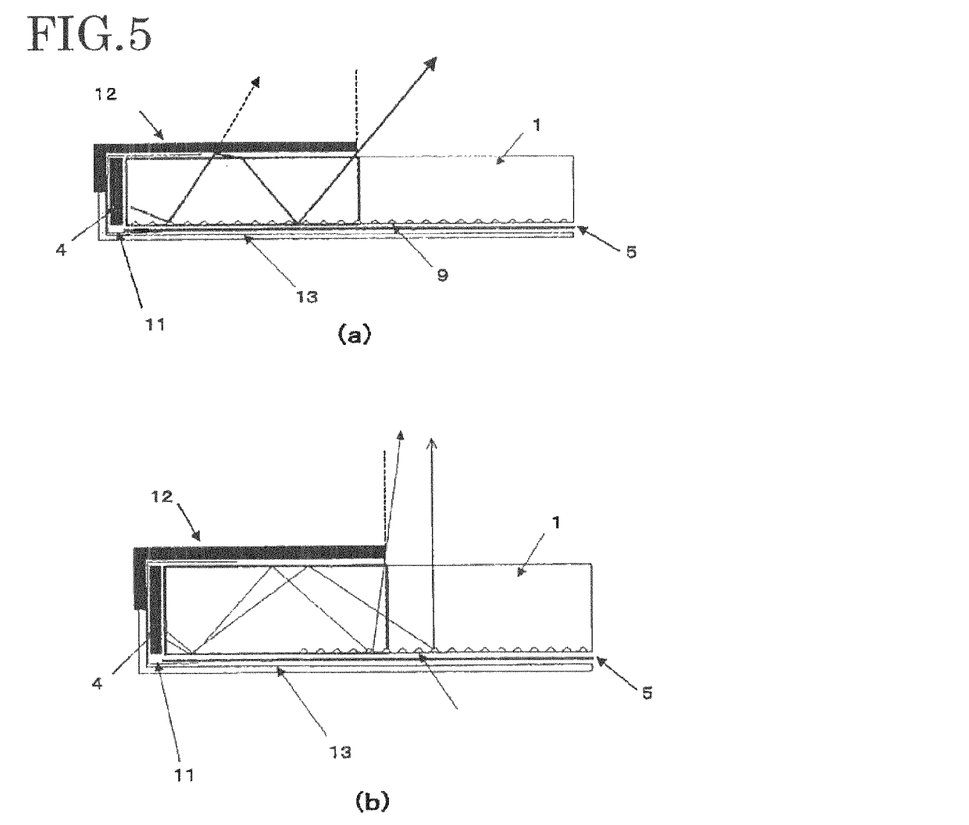

Next, in a case where the concave stripes are arranged just beneath the supporting frame, beyond the scope determined by the present invention, a reason that light leakage at the opening boundary occurs and exterior appearance of the apparatus becomes worth is explained with reference to FIG. 5(a). Light entered the incident end surface of the light-guiding plate by the concave stripes arranged just beneath the supporting frame of the liquid crystal panel is moved toward to the exit surface, and usually emitted from the exit surface (see arrow shown by a dashed line). However, the light is reflected on the back surface of the supporting frame, returned into the light-guiding plate again, reflected on the concave stripes or reflection sheet to be guided to the exit surface of the light-guiding plate again, and a certain degree of the light is emitted from the opening area of the supporting frame (see arrow shown by a solid line). In this way, in the supporting frame boundary, because light emitted from a deviated light-emitting place for the existence of the back surface of the supporting frame overlaps on the light emitted by the concave stripes of the light-guiding plate fundamentally, the opening area of the supporting frame becomes bright for light leakage, consequently, the apparatus has worth exterior appearance. On the contrary, a reason possible to reduce light leakage by the present invention is explained hereinafter with reference to FIG. 5(b). A component of light guided in the light-guiding plate increases by increasing an area of the concave stripes provided in the bottom surface of the light-guiding plate at the incident end surface side just beneath the supporting frame. Consequently, because the light which is emitted by the concave stripes arranged in the bottom surface just beneath the supporting frame and causes the light leakage is reduced, only required luminescence can be emitted from the opening area of the supporting frame, thereby the exterior appearance can be prevented from becoming worth by the light leakage.

In addition, it is possible to remove dark lines by the same principle as in the V character-like shape even in concave stripes each having a trapezoidal shape in section provided in the bottom surface of the light-guiding plate.

In the present invention, convex stripes may be provided on the exit surface at predetermined pitches. Each of the convex stripes has a trapezoidal shape as mentioned hereinafter, and may be substantially the same as or similar to that used in a conventional surface light source element.

Each of the convex stripes includes a protrusion configured to extend in one direction. Each of the convex stripes may have a predetermined shape such as a triangular shape, a wedge-like shape, other polygonal shape, an undulate shape, a half-ellipsoidal shape or the like in section.

Figure 6:
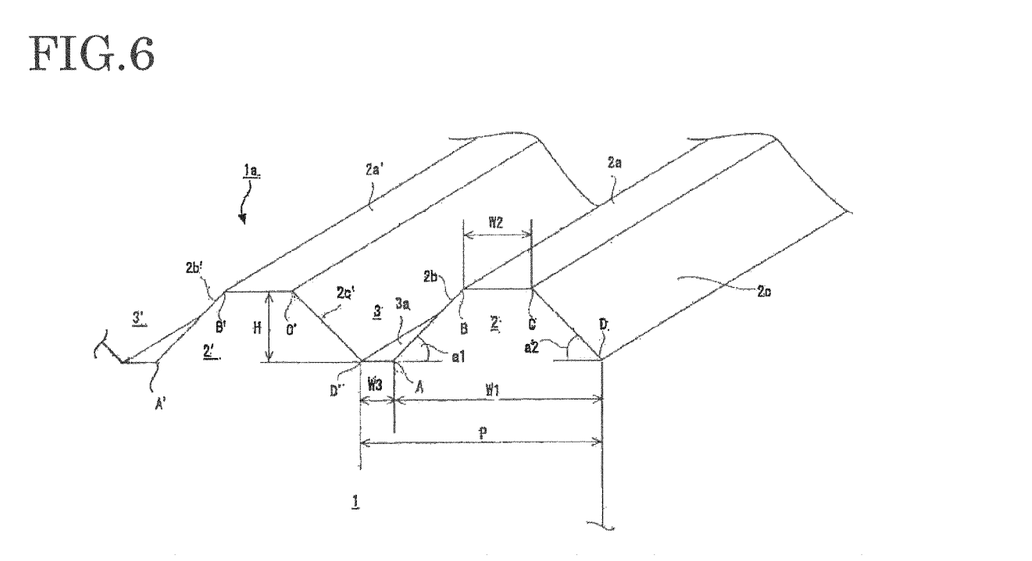
[FIG. 6] is a schematic view explaining trapezoidal convex stripes provided on an exit surface of the light-guiding plate included in the surface light source element according to the present invention.

In the light-guiding plate included in the surface light source element according to the present invention, if each of the convex stripes provided on the exit surface has a trapezoidal shape, the structure is more preferable in that high front brightness in a viewing direction and a wide view angle characteristic can be acquired. For example, in a surface of a light-guiding plate 1 as shown in FIG. 6, there is shown a portion 1a of the surface, a convex stripe 2 having a trapezoidal shape in section including apexes A, B, C and D and a convex stripe 2' having a trapezoidal shape in section including apexes A', B', C' and D' are arranged at an interval in the surface portion 1a. Meanwhile, the trapezoidal shape of the convex stripe provided on the light-guiding plate included in the surface light source element according to the present invention is not limited to a strict trapezoidal shape. As will be clear from a description mentioned hereinafter, if the convex stripe has a manner in which an upper bottom and a lower bottom which have a flat surface, are parallel to the X-Y plane and differ in height, and inclined surfaces connecting the upper bottom and the lower bottom in a mountain shape are continuously arranged, for example, a connection portion between the upper bottom or the lower bottom and each inclined surface may be formed in a curved shape. The trapezoidal shape having the curved connection portion is preferably not only advantageous in manufacturing for relatively easy formation but also difficult to generate failure of the connection portion. At least a part of the upper bottom or the lower bottom may have an inclination to the X-Y plane, for example, if the upper bottom and/or the lower bottom have a gentle wave-shaped part, a length direction of which corresponds to a direction of the X axis, or concavity and convexity, high evenness of luminescence can be acquired. An average of the inclination has preferably no angle to the X-Y plane. In addition, it is desirable that a portion in which the inclination is less 10 degrees accounts totally more 50%. Because the plurality of upper bottoms and lower bottoms exist together in the same X-Y plane, not only efficient guide of light can be accomplished, but also there is an advantageous effect that stable gravity center of the light-guiding plate can be acquired, thereby industrially advantageous continuous manufacturing in an extrusion or the like can be easily accomplished.

Figure 7:
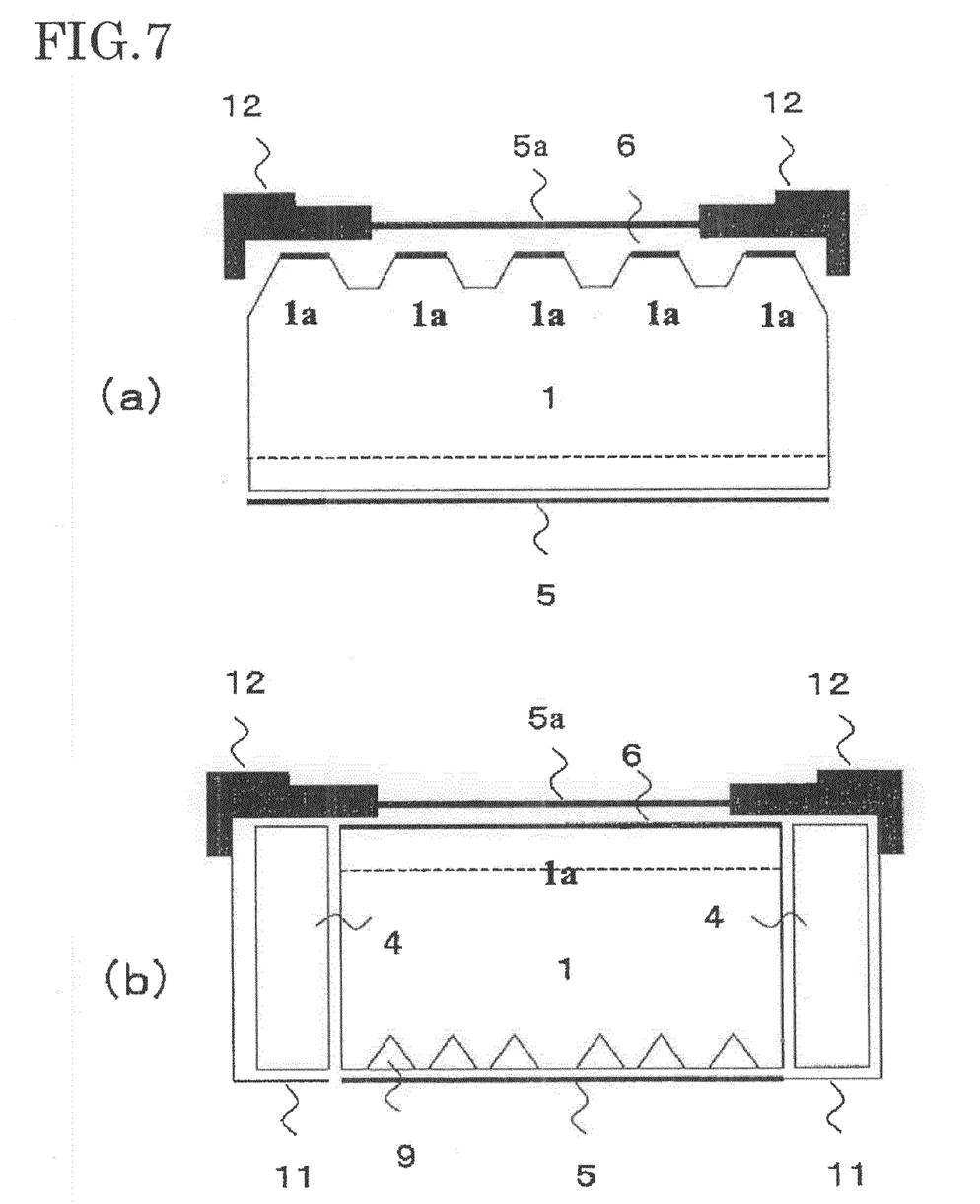
[FIG. 7] is a schematic view showing one example of the surface light source element according to the present invention, wherein (a) and (b) are an X-Z sectional view and a Y-Z sectional view which pass through a central point of the surface light source element, respectively.

Next, a function of the convex stripes each having the trapezoidal shape is mentioned with reference to FIG. 7. The technical terms, "upper bottom surface" and "lower bottom surface" are used, but they do not mean up and down directions and are used for convenience on description. Here, of trapezoidal parallel opposite sides, a short side is an upper bottom and a long side is a lower bottom. It is established in FIG. 6 that a length of a straight line AD (width of a lower bottom of the convex stripe 2) is W1, a length of a straight line BC (width of an upper bottom 2a of the convex stripe 2) is W2, a length of a straight line AD' (width of a lower bottom 3a of a concave stripe 3) is W3, a height of the convex stripe 2 (or depth of the concave stripe 3) is H, an angle formed by the straight line AD and a straight line AB (inclined surface 2b) is a1, an angle formed by the straight line AD and a straight line DC (inclined surface 2c) is a2, and a length of a straight line DD' is a pitch P. The pitch P is equal to a sum of the width W1 (length of the straight line AD) of the lower bottom of the convex stripe 2 and the width W3 of the upper bottom 3a of the concave stripe 3, and a sum of the width W2 (length of the straight line BC) of the upper bottom 2a of the convex stripe 2 and the width (length of the straight line BC') of the lower bottom of the concave stripe 3.

In the exit surface of the light-guiding plate included in the surface light source element according to the present invention, by forming the sectional shape of the convex stripe 2 in a trapezoidal shape and setting an adequate width W2 to the convex stripe 2, of brightness distribution emitted from the exit surface, it is possible to acquire high brightness in a front direction perpendicular to the exit surface, while taking a role in which light entered the light-guiding plate passing through the incident end surface is guided to a central portion of the light-guiding plate.

In addition, in the exit surface of the light-guiding plate included in the surface light source element according to the present invention, by forming the sectional shape of the concave stripe 3 in a trapezoidal shape and setting a desired width W3 to the concave stripe 3, similarly to the width W2 as mentioned above, of brightness distribution emitted from the exit surface, it is possible to acquire high brightness in a front direction perpendicular to the exit surface, while taking a role in which light entered the light-guiding plate passing through the incident end surface is guided along a direction of the Y axis in the light-guiding plate. If the width W2 is too small and contribution of the inclined surfaces 2b and 2c is too large, it is difficult to achieve sufficiently an advantageous effect to improve brightness in a vertical direction. Even if the width W3 is too small and contribution of the inclined surfaces 2b and 2c is too large, it is difficult to achieve sufficiently an advantageous effect to improve brightness in a vertical direction. On the contrary, if the width W2 or the width W3 is set to be too larger than the inclined surfaces 2b and 2c relatively, the contribution of the inclined surfaces 2b and 2c is less relatively, and the brightness in the vertical direction is increased, but because a view angle is narrow, it is not possible to accomplish sufficiently an object in which a view angle can be acquired by providing a periodical pattern of convex stripes on the exit surface and omitting a directional sheet as much as possible, without reducing the brightness in the vertical direction.

In the exit surface of the light-guiding plate included in the surface light source element according to the present invention, a shape, a size, and a pitch P of each of the convex stripes 2 or concave stripes 3 are decided in consideration of a relationship among a size of the light-guiding plate 1, display performance of the surface light source element and specifications or the like. Thereby, it is possible to maintain adequately brightness of light emitted from the exit surface of the light-guiding plate and acquire appropriate view angle.

A general height H of the convex stripe 2 (or the concave stripe 3) is selected from a range of 1 μm to 100 μm, more preferably 5 μm to 50 μm, most preferably 10 μm to 30 μm. In addition, general inclined angles a1 and a2 are respectively selected from a range of 15 to 70°, more preferable inclined angles a1 and a2 are respectively selected from a range of 15° to 60°. If the view angle characteristic is especially emphasized, the inclined angles a1 and a2 are respectively selected from a range of 15° to 35°, if the brightness characteristic is especially emphasized, the inclined angles a1 and a2 are selected from a range of 35° to 60° which is the most preferable range. Also, the general width W1 of the lower bottom is selected from a range of 10 μm to 500 μm, more preferably 15 μm to 270 μm, most preferable 15 μm to 180 μm. The width W2 of the upper bottom is selected from a range of 1 μm to 500 μm, more preferably 1 μm to 100 μm, most preferable 5 μm to 50 μm. The general width W3 is selected from a range of 0.1 μm to 500 μm, more preferably 0.1 μm to 300 μm, most preferable 1 μm to 150 μm.

In a preferred mode of the exit surface of the light-guiding plate included in the surface light source element according to the present invention, the exit surface of the light-guiding plate 1 is characterized in that the exit surface has a trapezoidally-shaped pattern in which the widths W1, W2 and W3 are formed by maintaining a particular ratio relationship with the pitch P. That is to say, in the exit surface of the light-guiding plate 1 included in the surface light source element according to the present invention, a ratio W3/W2 of the width W3 of the upper bottom formed on the concave stripe 3 to the width W2 of the upper bottom formed on the convex stripe 2 is preferably within a range of 0.01 to 200, more preferably 0.02 to 100, and most preferably 0.1 to 10. In addition, a ratio of (P−W2−W3) to (W2+W3) is within a range of 0.04 to 400, more preferably 0.2 to 200, most preferably 0.3 to 150.

In the exit surface of the light-guiding plate included in the surface light source element according to the present invention, by maintaining the ration of the width W3 to the width W2 in the aforementioned ranges, brightness of light emitted from the exit surface of the light-guiding plate 1 is adequately maintained, and a condition setting to acquire adequate view angle is facilitated. Here, if a ratio of the width W3 to the width W2 is within a range of 0.1 to 10, because the brightness in the vertical direction is enhanced, the directional sheet can be omitted.

Figure 9:
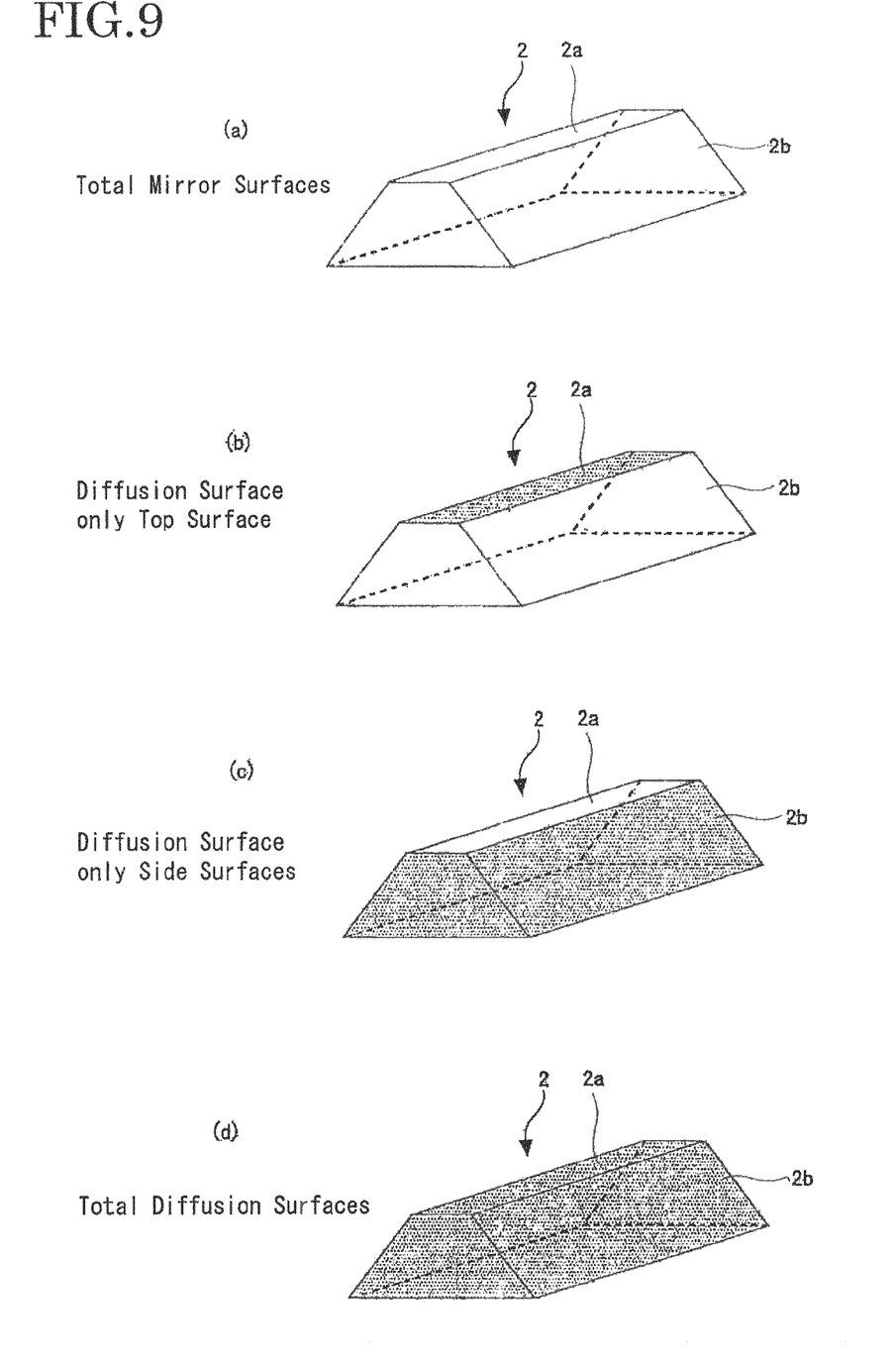
[FIG. 9] is a view explaining a surface characteristic of the trapezoidal convex stripes provided on the exit surface of the light-guiding plate included in the surface light source element according to the present invention.

Moreover, if the ratio of (P−W2−W3) to (W2+W3) is within a range of 0.3 to 150, because the reduction of the brightness in the vertical direction is inhibited and the view angle characteristic can be ensured, the directional sheet can be omitted. The trapezoidally-shaped pattern may have a surface formed in a mirror surface, but the surface may be formed in a diffusion surface which is roughened. By the pattern being roughened, it is possible to inhibit glare on a surface of the crystal liquid device. In some cases, it is possible to avoid generation of dark lines confirmed when looking corner portions of a rectangular light-guiding plate from an angle. Thereby, an obtained liquid crystal device can have excellent surface quality. In the roughened surface, a computed average roughness Ra based on, for example, JIS B0601 is preferably within a range of 0.1 μm to 10 μm, more preferably 0.15 μm to 5 μm, especially preferably 0.2 μm to 2 μm. In addition, the roughened surface may be provided only on the upper bottom (top surface) 2a of each of the convex stripes 2 as shown in FIG. 9(b), but may be provided on both of the inclined surfaces 2b and the upper bottom 2a (all diffusion surface), as shown in FIG. 9(d). Moreover, the roughened surface may be provided only on a side surface portion (inclined surface 2b), as shown in FIG. 9(c). Furthermore, the roughened surface may be provided on the upper bottom (top surface) 3a of each of the concave stripes 3. A diffusion surface is formed by roughening the surface, thereby light emitted from the exit surface can expect high brightness quality even in either case as mentioned above.

Next, an example of a surface light source element using the aforementioned light-guiding plate 1 is explained with reference to FIGS. 1 and 7. The surface light source element 10 is generally composed of a light-guiding plate 1 which is a flat plate-like transparent structure made of a transparent resin or the like such as acrylate resin, light-emitting units 4a arranged on one side surface of the light-guiding plate 1, and a reflection sheet 5 disposed at a lower surface of the light-guiding plate 1. An exit surface 6 to emit light is provided on an upper surface of the light-guiding plate 1. A bottom surface 7 disposed to opposite to the exit surface 6 is provided on the light-guiding plate 1.

Figure 1:
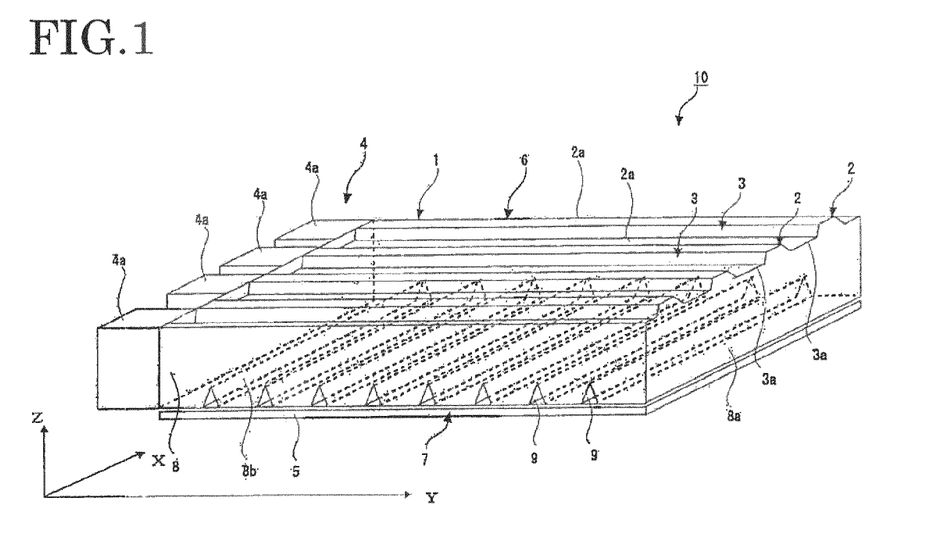
[FIG. 1] is a perspective view showing one example of a surface light source element according to the present invention.

FIG. 1 is a perspective view showing one example of the surface light source element according to the present invention. Here, in the surface light source element 10 as shown in FIG. 1, the light-emitting units 4*a* are arranged on the one side surface of the light-guiding plate 1. The side surface is formed in an incident end surface 8. The plurality of light-emitting units 4*a* arranged on the one incident end surface are formed as a primary light source 4. Both side surfaces intersecting with the incident end surface 8 are formed in reflection end surfaces 8*b*. A surface opposite to the incident end surface 8 is formed in a reflection end surface 8*a*.

FIG. 7 illustrates an example of a surface light source element according to the present invention, in which primary light sources are disposed on two opposite side surfaces of a light-guiding plate. The surface light source element is used to display a large sized liquid crystal image display apparatus. FIGS. 7(*a*) and 7(*b*) are an X-Z sectional view and an X-Z sectional view which pass through a central point of the surface light source element, respectively.

Light source reflectors 11 in each of which light-emitting units 4*a* are disposed are disposed at the both side surfaces of the exit surface 6 and the bottom surface 7. A thick light-guiding plate 1 is used to acquire sufficiently an amount of light entered the light-guiding plate 1 from the light-emitting units 4*a*. Thereby, the both side surfaces on which the light-emitting units are arranged are formed in incident end surfaces 8, both side surfaces intersecting with the incident end surfaces 8 are formed in reflection end surfaces 8*b*. Moreover, in the surface light source element as shown in FIG. 7, a diffusion sheet 5*a* is disposed above the exit surface 6. By disposing the diffusion sheet above the light-guiding plate, it is possible to uniformize adequately light emitted from the surface light emitting element and hence achieve high screen quality. In addition, by selecting an appropriate diffusion sheet, it is possible to further improve front brightness too.

In each of the surface light source elements as shown in FIGS. 1 and 7, convex stripes 2 each having a trapezoidal shape in section and concave stripes 3 each having a trapezoidal shape inverted in up and down with respect to the trapezoidal shape of the convex stripe are arranged alternately on the exit surface 6. Because the convex stripes 2 and the concave stripes 3 are substantially the same as the surface 1*a* as mentioned with reference to FIG. 6, a detailed description thereof is omitted. Consequently, a plurality of convex and concave stripes which have trapezoidal shapes in section and are perpendicular to the incident end surfaces are arranged on the exit surface 6. On the other hand, a plurality of concave stripes 9 each having a V character-shape in section are provided on the bottom surface 7 to be arranged parallel to the incident end surfaces 8. By adjusting pitches P of the V character-like concave stripes 9 progressively, it is possible to adjust a distribution amount of light emitted from the exit surface.

Next, the surface light source element 10 structured as mentioned above is explained.

Light emitted from the light-emitting units 4*a* is entered the light-guiding plate 1 passing through the incident end surface 8 of the light-guiding plate 1, and transmitted in a longitudinal direction while repeating total reflection between the exit surface 6 and the bottom surface 7. A part of the light is guided toward the exit surface 6 the V-character shaped concave stripes 9 formed in the bottom surface 7 and the reflection sheet 5, and is collected by a prism (convex stripes 2 and concave stripes 3) having a trapezoidal shape in section formed on the exit surface 6, and emitted in a predetermined view angle.

In this way, by forming the trapezoidal-shaped prism in section on the exit surface 6, it is possible to inhibit more the brightness reduction in the vertical direction than as in a V-character grooved prism formed on the exit surface 6 and broaden the view angle.

An image display apparatus according to the present invention is structured by disposing a light-transmitting type-display in a front direction of the surface light source element, it is possible to display a clear image having high quality, high brightness, high even brightness, without reducing image quality due to dark lines. Here, the image display apparatus according to the present invention includes display modules combining the surface light source element and a display element, and instruments having at least image display functions using the display modules such as personal computers or televisions or the like.

Embodiments

Advantageous effects of the present invention are concretely explained hereinafter based on embodiments.

<Embodiment 1>

A mirror stamper made of SUS was used for forming a stamper (hereinafter referred to as stamper I) of an exit surface side. On the other hand, a stamper (hereinafter referred to as stamper II) of a bottom surface side and in which prism patterns each having 0.02 mm in height and 100° in top angle were arranged at predetermined intervals was manufactured by directly forming V-character like concave stripes each having 0.02 mm in height and 100° in top angle in a master mold by a cutting work using a diamond byte, forming a nickel electroformed layer by performing direct electroforming on the layer directly, and peeling a master thus formed from the master mold. As molds, the stampers I and II were assembled in a mold stationary side cavity and a mold movable side cavity of an injection machine, and a light-guiding plate having a fine structure for a 32 inch-liquid crystal television was obtained by use of an injection molding process. The obtained light-guiding plate was formed to have an outside size of 707 mm×420 mm×4.5 mm in width, length and height. The light-guiding plate was formed to have an exit surface formed by a mirror surface and a bottom surface in which V-character shaped prism patterns are arranged (each having a height of 0.02 mm and an average angularity of 40° of an inclined surface corresponding to an average bottom angle in each of the concave stripes parallel to an X axis in an incident end surface side, to the bottom surface). The prism patterns were arranged to be changed from the incident end surface of the light-guiding plate to a position of 10.3 mm so that pitches are reduced progressively and fluently from 0.848 mm at an incident end surface side to 0.371 mm at a central portion.

A multi-chip LED module (outside size: 13.7 mm and light-emitting length: 11.4 mm) of model No. SEP8WA2001 made by Sanken Electric Co., Ltd. was used as a light-emitting unit. In order to form a primary light source, fifty two of light-emitting units were arranged at equal intervals (13.9 mm). End surfaces of the light-guiding plate in a lateral direction thereof were formed in incident end surfaces which are arranged parallel to the X axis, and the primary light sources were disposed along the opposite two incident end surfaces. The total, 2×52=104 light-emitting units were used in order to be arranged on the opposite two incident end surfaces. In addition, one diffusion sheet (model No. D121UZ made by Tsujiden Co. LTD) was disposed on the exit surface of the light-guiding plate, and a brightness-up film (model No. BEF III-90/50T-7 made by Sumitomo 3M Ltd.) was further disposed so that long sides of prisms are parallel to the X axis, and a diffusion sheet (model No. PBS072H made by Keiwa Inc.) was further disposed on the brightness-up film. In addition, a reflection sheet 5 (model No. E6SL made by Toray Industries, Inc.) was disposed on each of a bottom surface 7 and reflection end surfaces 8b, and the aforementioned parts were contained in a metallic frame.

A supporting frame made of polystyrene was disposed from above the metallic frame and combined to the metallic frame located on a back surface of the supporting frame.

An inner size of an opening portion of the supporting frame was 698 mm×393 mm in width and length, and a light-shielding length from an end surface of the light-guiding plate was 4.5 mm in width and 13.5 mm in length. Accordingly, the prism patterns provided on the bottom surface of the light-guiding plate were into a beneath-light side of the supporting frame from an opening boundary of a supporting frame by 3.2 mm, an angle θ was 35°.

Figure 8:
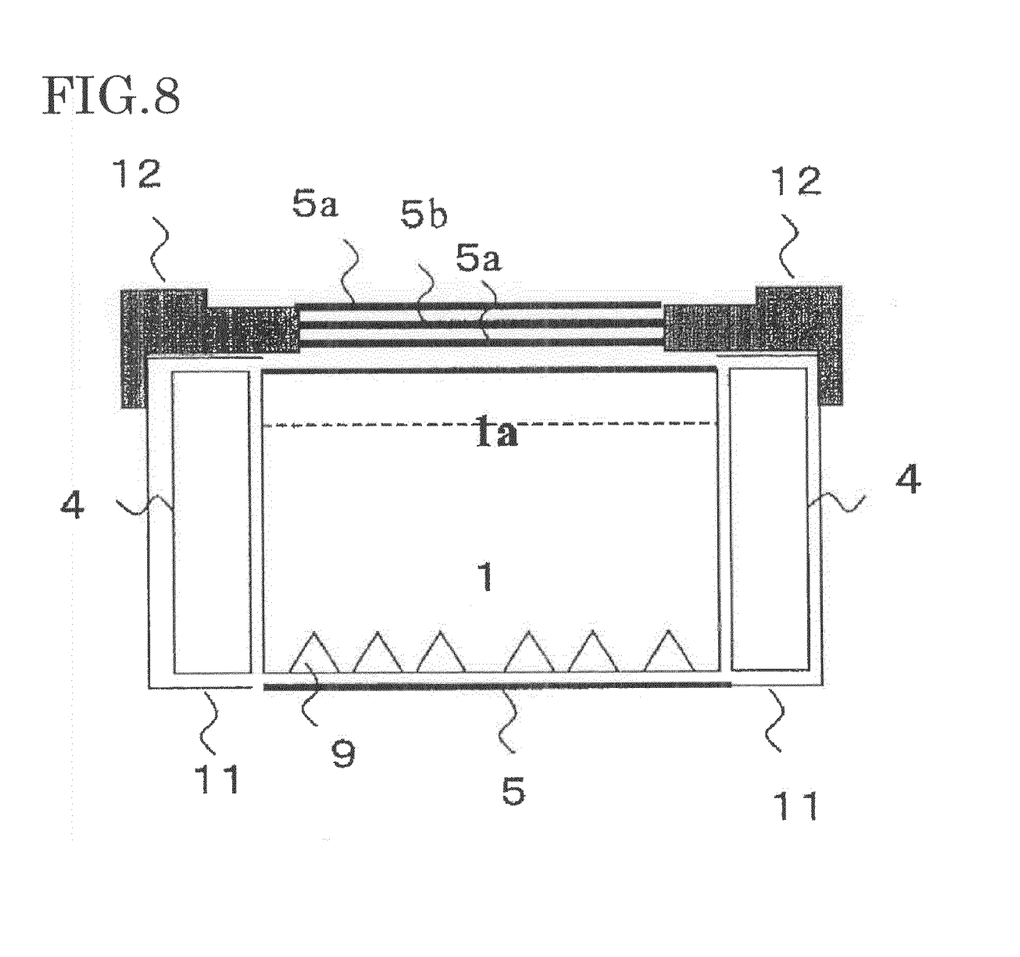
[FIG. 8] is a schematic view showing a constitution of the surface light source element in an embodiment and a comparison example.

In the backlight device thus formed and shown in FIG. 8, brightness performance was measured by applying the current of 25 mA to each light-emitting unit through a low current circuit. A brightness meter (TOPCON BM-7 made by Topcon Corporation) was used for the brightness measurement to measure a central brightness of the backlight device. Image quality was evaluated by visual judgment. Evaluation items include whether light leakage at the opening boundary of the supporting frame and dark lines are of problems. Consequently, the central brightness was 11085 cd/m$^2$, image quality at the opening boundary of the supporting frame was good, and dark lines and light leakage as viewed from a front direction and an angle were not generated.

<Embodiment 2>

A negative type photoresist (CA3000) made by Tokyo Ohka Kogyo Co., Ltd. was applied to a cleaning glass and heated for 2 minutes by a hotplate of 110° C. and thereafter cooled to a temperature. A photomask in which slits are provided at predetermined intervals was closely fitted to the glass substrate, they were rotated at a constant speed from −35° to +35° and during the rotation, UV light, 1400 mj was irradiated. After the photomask was removed, the substrate was developed. A nickel conducted film was applied to a surface of the obtained master by use of an ordinary method, and a nickel electroformed layer was formed by electroforming nickel as an electroforming metal on the nickel conducted film. In addition, a stamper (hereinafter referred to as stamper III) for the exit surface side, in which was made by removing the master from the nickel conducted film.

On the other hand, a stamper (hereinafter referred to as stamper IV) of the bottom surface side, in which prism patterns each having 0.02 mm in height and 100° in top angle are arranged at predetermined intervals was made by forming V-character shaped concave stripes each having the top angle of 100° and the height of 0.02 mm in a master mold directly by use of a diamond byte through a cutting process, performing direct electroforming from the master mold to form a nickel electroformed layer, and removing a master therefrom.

To use the stampers III and IV as molds, the stampers were assembled in a mold-stationary side cavity and a mold-movable side cavity of an injection machine, and a light-guiding plate for a 32 inch-liquid crystal television, having a fine structure was acquired through an injection forming process. An outside size of the light-guiding plate had 707 mm×420 mm×4.5 mm in width, length and height.

The obtained light-guiding plate includes an exit surface on which convex stripes each having a trapezoidal shape in section are arranged at predetermined intervals and a bottom surface in which concave stripes each having a V-character shape in section are arranged at predetermined pitches. In each of the trapezoidal convex stripes provided on the exit surface, a height H was 0.01 mm, a width W2 of a top portion 0.01 mm, a width W1 of a bottom surface 0.024 mm, and in each of the V-character shaped concave stripes or prism patterns provided in the bottom surface, a height was 0.02 mm, and an average angularity of an inclined surface corresponding to an average bottom angle in each of the concave stripes parallel to an X axis in an incident end surface side, to the bottom surface was 40°. The prism patterns were arranged to be changed from the incident end surface of the light-guiding plate to a position of 10.3 mm so that pitches are reduced progressively and fluently from 0.812 mm at an incident end surface side to 0.287 mm at a central portion.

The light-guiding plate was assembled in a backlight device as shown in FIG. 8, similarly to the embodiment 1. The prism patterns provided on the bottom surface of the light-guiding plate were into a beneath-light side of the supporting frame from an opening boundary of a supporting frame by 3.2 mm, an angle θ was 35°.

Similarly to the embodiment 1, central brightness measurement and visual evaluation were performed. Consequently, the central brightness was 11668 cd/m$^2$, image quality at the opening boundary of the supporting frame is good, and dark lines and light leakage as viewed from a front direction and an angle were not generated.

COMPARISON EXAMPLE 1

The comparison example is an example of a case where the angle θ in each of the V-character shaped concave stripes provided in the bottom surface of the light-guiding plate used in the embodiment 1 is 71°.

Similarly to the embodiment 1, a nickel electroformed layer was formed by making directly V-character shaped concave stripes each having 0.02 mm in height and 100° in top angle in a master mold by use of a diamond byte through a cutting process, and performing direct electroforming from the master mold. By removing a master, a stamper V of a bottom surface side and in which prism patterns each having 0.02 mm in height and 100° in top angle were arranged at predetermined intervals and finished was manufactured.

As molds, the stamper I used in the embodiment 1 and the stamper V were assembled in a mold stationary side cavity and a mold movable side cavity of an injection machine, and a light-guiding plate having a fine structure for a 32 inch-liquid crystal television was obtained by use of an injection molding process. The obtained light-guiding plate was formed to have an outside size of 707 mm×420 mm×4.5 mm in width, length and height.

The light-guiding plate was adjusted to have an exit surface formed in a mirror surface and a bottom surface in which the prism patterns each having a V-character shape in section are arranged from the incident end surface of the light-guiding plate. Each of the prism patterns on the bottom surface of the light-guiding plate was formed to have a height of 0.02 mm and an average angularity of 40° of an inclined surface corresponding to an average bottom angle in each of the concave stripes parallel to an X axis in an incident end surface side, to the bottom surface. The prism patterns were changed so that from a position of 0.4 mm from the incident end surface of the light-guiding plate, pitches are reduced progressively and fluently from 0.848 mm at an incident end surface side to 0.371 mm at a central portion.

The light-guiding plate was assembled in a backlight device as shown in FIG. 8, similarly to the embodiment 1.

Accordingly, the prism patterns provided on the bottom surface of the light-guiding plate were into a beneath-light side of a supporting frame from an opening boundary of a supporting frame by 13.1 mm, an angle θ was 71°.

Similarly to the embodiment 1, central brightness measurement and visual evaluation were performed. Consequently, the central brightness was 10464 cd/m², and light leakage at the opening boundary of the supporting frame occurred, and screen quality reduced.

COMPARISON EXAMPLE 2

The comparison example is an example of a case where the angle θ in each of the V-character shaped concave stripes provided in the bottom surface of the light-guiding plate used in the embodiment 2 is 71°.

Similarly to the embodiment 2, a nickel electroformed layer was formed by making directly V-character shaped concave stripes each having 0.02 mm in height and 100° in top angle in a master mold by use of a diamond byte through a cutting process, and performing direct electroforming from the master mold. By removing a master, a stamper VI of a bottom surface side and in which prism patterns each having 0.02 mm in height and 100° in top angle were arranged at predetermined intervals and finished was manufactured.

As molds, the stamper III used in the embodiment 2 and forming the patterns of the V-character shaped convex stripes in section on the exit surface and the stamper VI were assembled in a mold stationary side cavity and a mold movable side cavity of an injection machine, and a light-guiding plate having a fine structure for a 32 inch-liquid crystal television was obtained by use of an injection molding process. The obtained light-guiding plate was formed to have an outside size of 707 mm×420 mm×4.5 mm in width, length and height.

The obtained light-guiding plate was adjusted to have an exit surface on which the convex stripes are formed at intervals and each having a trapezoidal shape in section and an incident end surface(s) in which the prism patterns each having a V-character shape in section are arranged. Each of the trapezoidal convex stripes on the exit was formed to have a size in which a height H is 0.01 mm, a width W2 of a top portion is 0.01 mm and a width W1 of a bottom surface is 0.024 mm. Each of the prism patterns on the bottom surface has 0.02 mm in height, and an average angularity of 40° of an inclined surface corresponding to an average bottom angle in each of the concave stripes parallel to an X axis in an incident end surface side, to the bottom surface. The prism patterns were changed so that from a position of 0.4 mm from the incident end surface of the light-guiding plate, pitches are reduced progressively and fluently from 0.853 mm at an incident end surface side to 0.301 mm at a central portion.

The light-guiding plate was assembled in a backlight device as shown in FIG. 8, similarly to the embodiment 1. Accordingly, the prism patterns provided on the bottom surface of the light-guiding plate were into a beneath-light side of a supporting frame from an opening boundary of a supporting frame by 13.1 mm, an angle θ was 71°.

Similarly to the embodiment 1, central brightness measurement and visual evaluation were performed. Consequently, the central brightness was 11000 cd/m², and light leakage at the opening boundary of the supporting frame occurred, and screen quality reduced.

COMPARISON EXAMPLE 3

The comparison example is an example of a case where the angle θ in each of the V-character shaped concave stripes provided in the bottom surface of the light-guiding plate used in the embodiment is 6°.

Similarly to the embodiment 1, a nickel electroformed layer was formed by making directly V-character shaped concave stripes each having 0.02 mm in height and 100° in top angle in a master mold obtained by use of a diamond byte through a lathe turning, and performing direct electroforming from the master mold. By removing a master, a stamper IX of a bottom surface side and in which prism patterns each having 0.02 mm in height and 100° in top angle were arranged at predetermined intervals and finished was manufactured.

As molds, the stamper III used in the embodiment 2 and forming trapezoidal convex patterns on the exit surface and the stamper IX were assembled in a mold stationary side cavity and a mold movable side cavity of an injection machine, and a light-guiding plate having a fine structure for a 32 inch-liquid crystal television was obtained by use of an injection molding process. The obtained light-guiding plate was formed to have an outside size of 707 mm×420 mm×4.5 mm in width, length and height.

The obtained light-guiding plate was adjusted to have an exit surface on which the trapezoidal convex stripes in section are arranged at intervals and a bottom surface in which the prism patterns each having a V-character shape in section are arranged at predetermined pitches. Each of the trapezoidal convex stripes on the exit surface was formed to have a size in which a height is 0.01 mm, a width W2 of a top portion is 0.01 mm and a width W1 of a bottom surface is 0.024 mm, a height of each V-character shaped prism pattern on the bottom surface is 0.02 mm, and an average angularity of 40° of an inclined surface corresponding to an average bottom angle in each of the concave stripes parallel to an X axis in an incident end surface side, to the bottom surface. The prism patterns were changed so that from a position of 12.3 mm from the incident end surface of the light-guiding plate, pitches are reduced progressively and fluently from 0.804 mm at an incident end surface side to 0.283 mm at a central portion.

The light-guiding plate was assembled in a backlight device as shown in FIG. 8, similarly to the embodiment 1. Accordingly, the prism patterns provided on the bottom surface of the light-guiding plate were into a beneath-light side of a supporting frame from an opening boundary of a supporting frame by 1.2 mm, an angle θ was 15°.

Similarly to the embodiment 1, central brightness measurement and visual evaluation were performed. Consequently, the central brightness was 10863 cd/m², and brightness at the opening boundary of the supporting frame as viewed from a front, or an angle was very reduced, and a dark part was clearly viewed.

Industrial Applicably

When using the light-guiding plate included in the surface light source element according to the present invention, because it is possible to inhibit light leakage occurring at a boundary of the supporting frame for the liquid crystal panel and reducing screen quality, or avoid a dark part, and acquire high brightness, the present invention can be adequately applied to a surface light source element. Because the surface light source element according to the present invention is an edge-light type, it can be expected to apply the surface light source element to various thinned image display apparatuses such as notebook computers, monitors, illumination announcements, traffic indicators, without being limited to televisions on which liquid crystal display panels are mounted.

DESCRIPTION OF REFERENCE NUMBERS

1: light-guiding plate
2: convex stripes

3: concave stripes
4: primary light source
4a: light-emitting units
5: reflection sheet
5a: diffusion sheet
5b: prism sheet
6: exit surface
7: bottom surface
8: incident end surface (side surface)
8a: reflection end surface (side surface)
8b: reflection end surface (side surface)
9: V-character shaped concave stripes
10: surface light source element
11: light source reflector
12: supporting frame
13: metallic frame
14: liquid crystal panel
15: optical sheet

The invention claimed is:

1. An edge-light type surface light source element, comprising:
    a light-guiding plate including at least a side surface, an exit surface, and a bottom surface opposite to the exit surface,
    at least one primary light source disposed on the side surface of the light-guiding plate, the light-guiding plate including an incident end surface configured to enter light emitted from the primary light source, reflection means provided on a bottom surface side of the light-guiding plate and configured to reflect light, and
    a supporting frame to support a liquid crystal panel and an optical sheet, which are provided on an exit surface side of the light-guiding plate,
    if a normal line of an X-Y plane formed an X axis and a Y axis perpendicular to the X axis is a Z axis, the primary light source being disposed parallel with the X axis,
    the reflection means, the light-guiding plate, the optical sheet, and the liquid crystal panel supporting frame being disposed parallel with the X-Y plane,
    the reflection means, the light-guiding plate, the optical sheet, and the supporting frame being sequentially disposed in a direction of the Z axis,
    the incident end surface of the light-guiding plate being disposed parallel with an X-Z plane,
    a pattern formed by a plurality of concave stripes arranged parallel with the X axis being provided in the bottom surface,
    inclined surfaces being provided on an incident end surface side of the plurality of concave stripes and arranged parallel with the X axis, an angularity of each of the inclined surfaces to the bottom surface being substantially within a range of 25° or more to 45° or less,
    if an angle formed by the Z axis and a straight line which combines an intersection point of a side parallel with the X axis, of an opening boundary inside the supporting frame and a Y-Z plane and a point at which the pattern provided on the bottom surface to be parallel with the X axis and formed by the plurality of concave stripes is set first is θ, and a distance getting from the opening boundary of the supporting frame of the liquid crystal panel into a back surface of the supporting frame is L, the pattern provided on the bottom surface and formed by the concave stripes parallel with the X axis being disposed to satisfy the following equation, and the angle θ being within a range of 20° to 60°.

$$L = T \cdot \tan\theta$$

T: thickness of light-guiding plate (mm)
L: distance getting from opening boundary of supporting frame of liquid crystal panel into back surface of supporting frame (mm).

2. The edge-light type surface light source element, according to claim 1, wherein primary light sources are arranged on two opposite incident end surfaces of the light-guiding plate, wherein the inclined surfaces of the plurality of concave stripes are arranged parallel with the two incident end surfaces and the X axis.

3. The edge-light type surface light source element, according to claim 1 or 2, wherein each of the concave stripes provided in the bottom surface of the light-guiding plate has a V-character shape in section.

4. The edge-light type surface light source element, according to claim 1 or 2, wherein each of the concave stripes provided in the bottom surface of the light-guiding plate has a trapezoidal shape in section.

5. The edge-light type surface light source element, according to claim 1 or 2, wherein a pattern comprising a plurality of convex stripes parallel with the Y axis is provided on the exit surface of the light-guiding plate.

6. The edge-light type surface light source element, according to claim 5, wherein each of the convex stripes provided on the exit surface of the light-guiding plate has a trapezoidal shape in section.

7. An image display apparatus, comprising
    the edge-light type surface light source element according to claim 1 or 2, and a light-transmitting type display element provided on an exit surface side of the surface light source element.

* * * * *